(12) United States Patent
Mooney

(10) Patent No.: US 10,058,086 B1
(45) Date of Patent: Aug. 28, 2018

(54) ICE FISHING POLE CARRIER FOR ALL TERRAIN VEHICLES, SNOWMOBILES AND THE LIKE

(71) Applicant: Edward Mooney, Big Lake, AK (US)

(72) Inventor: Edward Mooney, Big Lake, AK (US)

( * ) Notice: Subject to any disclaimer, the term of this patent is extended or adjusted under 35 U.S.C. 154(b) by 0 days.

(21) Appl. No.: 15/695,346

(22) Filed: Sep. 5, 2017

(51) Int. Cl.
*A01K 97/10* (2006.01)
*A01K 97/01* (2006.01)
*B60R 9/08* (2006.01)

(52) U.S. Cl.
CPC .............. *A01K 97/10* (2013.01); *A01K 97/01* (2013.01); *B60R 9/08* (2013.01)

(58) Field of Classification Search
CPC .... B60R 2011/0064–2011/0077; A01K 97/10; A01K 97/08; A47B 81/005
USPC ................................ 224/567, 570, 571, 922
See application file for complete search history.

(56) References Cited

U.S. PATENT DOCUMENTS

| | | | | |
|---|---|---|---|---|
| 2,171,053 A * | 8/1939 | White | ....................... | B60R 9/12 224/317 |
| 2,536,797 A * | 1/1951 | Cooke | ....................... | B60R 9/08 211/70.8 |
| 2,682,982 A * | 7/1954 | Fischer, Jr. | ............ | A01K 97/08 224/317 |
| 3,266,633 A * | 8/1966 | Graebner | ................... | B60R 9/02 211/64 |
| 4,411,461 A * | 10/1983 | Rosenberg | ................. | B60R 9/06 211/17 |
| 4,785,980 A * | 11/1988 | Redick | ....................... | B60R 9/12 206/315.1 |
| 4,871,099 A * | 10/1989 | Bogar, Jr. | ............... | A01K 97/10 211/70.8 |
| 5,033,223 A * | 7/1991 | Minter | .................... | A01K 97/10 224/486 |
| 5,108,020 A * | 4/1992 | Patrick | ....................... | B60R 9/12 224/319 |
| D343,151 S * | 1/1994 | Eckhart | ......................... | 224/521 |
| 5,435,473 A * | 7/1995 | Larkum | .................... | B60R 9/08 211/4 |
| 5,449,100 A * | 9/1995 | Eckhart | ..................... | B60R 9/06 224/509 |
| 5,641,108 A * | 6/1997 | Ewer | ......................... | B60R 9/06 224/502 |
| 5,815,976 A * | 10/1998 | Jernigan | ................. | A01K 97/10 224/922 |
| 5,842,615 A * | 12/1998 | Goodness | ................. | B60R 9/06 224/485 |
| 5,904,281 A * | 5/1999 | Mooers | ..................... | B60R 9/06 224/518 |

(Continued)

*Primary Examiner* — Brian D Nash
(74) *Attorney, Agent, or Firm* — Michael J. Tavella

(57) ABSTRACT

A carrier for ice fishing poles that is attached to the back of a snowmobile or ATV. It consists of a frame that has a clamp for fitting the carrier to the vehicle. It also has a center frame member that has a height adjustment. A hinged gate is attached to the center frame member. The inside of this gate is padded. A latching mechanism is on the gate opposite from the hinge. Below the gate is a frame that holds one or more vertical tubes that receive the ends of fishing poles. Thus, with the gate opened, one or more poles can be placed in the tube(s). Then the gate can be closed and secured. The poles are secured and are safe from inadvertent damage. At the fishing place, the user opens the gate to remove one or more poles, secures the gate, and is ready to fish.

10 Claims, 5 Drawing Sheets

(56) References Cited

U.S. PATENT DOCUMENTS

| | | | | |
|---|---|---|---|---|
| 6,681,971 | B2* | 1/2004 | Laverack | B60R 9/045 224/319 |
| 7,219,464 | B1* | 5/2007 | Kujawa | A01K 97/08 211/70.8 |
| 7,618,015 | B2* | 11/2009 | Jahnz | B60R 13/00 211/60.1 |
| 8,261,473 | B2* | 9/2012 | Bey | G09F 21/04 211/118 |
| 8,393,111 | B1* | 3/2013 | Johnson | A01K 97/08 211/70.8 |
| 8,590,758 | B2* | 11/2013 | Gray | B60P 3/10 224/501 |
| 8,746,469 | B1* | 6/2014 | De La Torre | B60R 9/08 211/70.8 |
| 8,800,788 | B1* | 8/2014 | Guidry | A01K 97/10 211/70.8 |
| 8,800,831 | B2* | 8/2014 | Gray | B60P 3/10 224/501 |
| 8,875,963 | B2* | 11/2014 | Knutson | A01K 97/08 224/405 |
| 9,446,717 | B2* | 9/2016 | Gray | B60P 3/10 |
| 2005/0092800 | A1* | 5/2005 | Wilson | B60R 9/06 224/513 |
| 2009/0261136 | A1* | 10/2009 | Skoff | B60R 9/06 224/519 |
| 2016/0052463 | A1* | 2/2016 | Cha | B60R 9/048 224/567 |

* cited by examiner

ICE FISHING POLE CARRIER FOR ALL TERRAIN VEHICLES, SNOWMOBILES AND THE LIKE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to carriers for ice fishing poles and particularly to carriers for ice fishing poles for use with all terrain vehicles (ATVs) or snowmobiles.

2. Description of the Prior Art

Ice fishing is a popular winter sport. It uses small fishing poles and an auger to drill a hole in the ice. Beyond that, most people who ice fish also have some type of seats. Many people also use portable shelters as well. In this way, the fisher-persons are protected from the elements while they fish in relative comfort.

Getting all of this equipment to the ice can be done in many ways. Snowmobiles, ATVs and even trucks can be used. Protecting the equipment is another issue. The fishing poles preferred for use are short and can be broken rather easily. This, there is a need for a device to protect these poles while being transported.

BRIEF DESCRIPTION OF THE INVENTION

The instant invention is a carrier for ice fishing poles that can easily be attached to the back of a snow mobile or ATV. It consists of a frame that has a clamp for fitting the carrier to the vehicle. It also has a center frame member that has a height adjustment. A hinged gate is attached to the center frame member. The inside of this gate is padded. A latching mechanism is provided on the gate opposite from the hinge. Below the gate is a lower frame that holds one or more vertical tubes that receive the ends of fishing poles. Thus, with the gate opened, one or more poles can be placed in the tube(s). Then the gate can be closed and secured. In this way, the poles are secured and are safe from inadvertent damage. As noted before, the device is attached to a vehicle so that the user simple goes to the preferred fishing spot, prepares the fishing place, opens the gate to remove one or more poles, secures the gate and then is ready to fish.

DETAILED DESCRIPTION OF THE INVENTION

Figure 1:
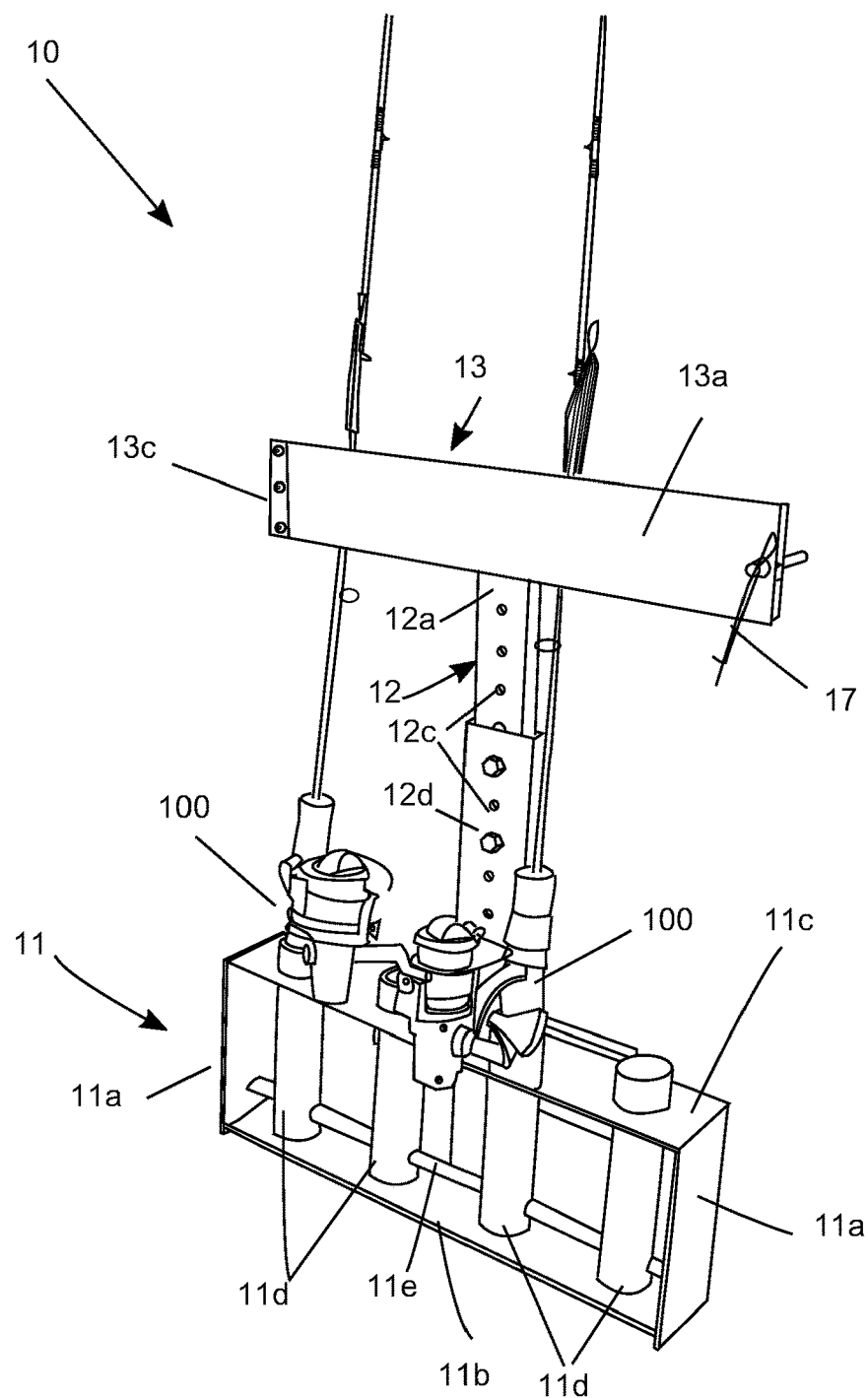
FIG. 1 is front perspective view of the invention.
Figure 2:
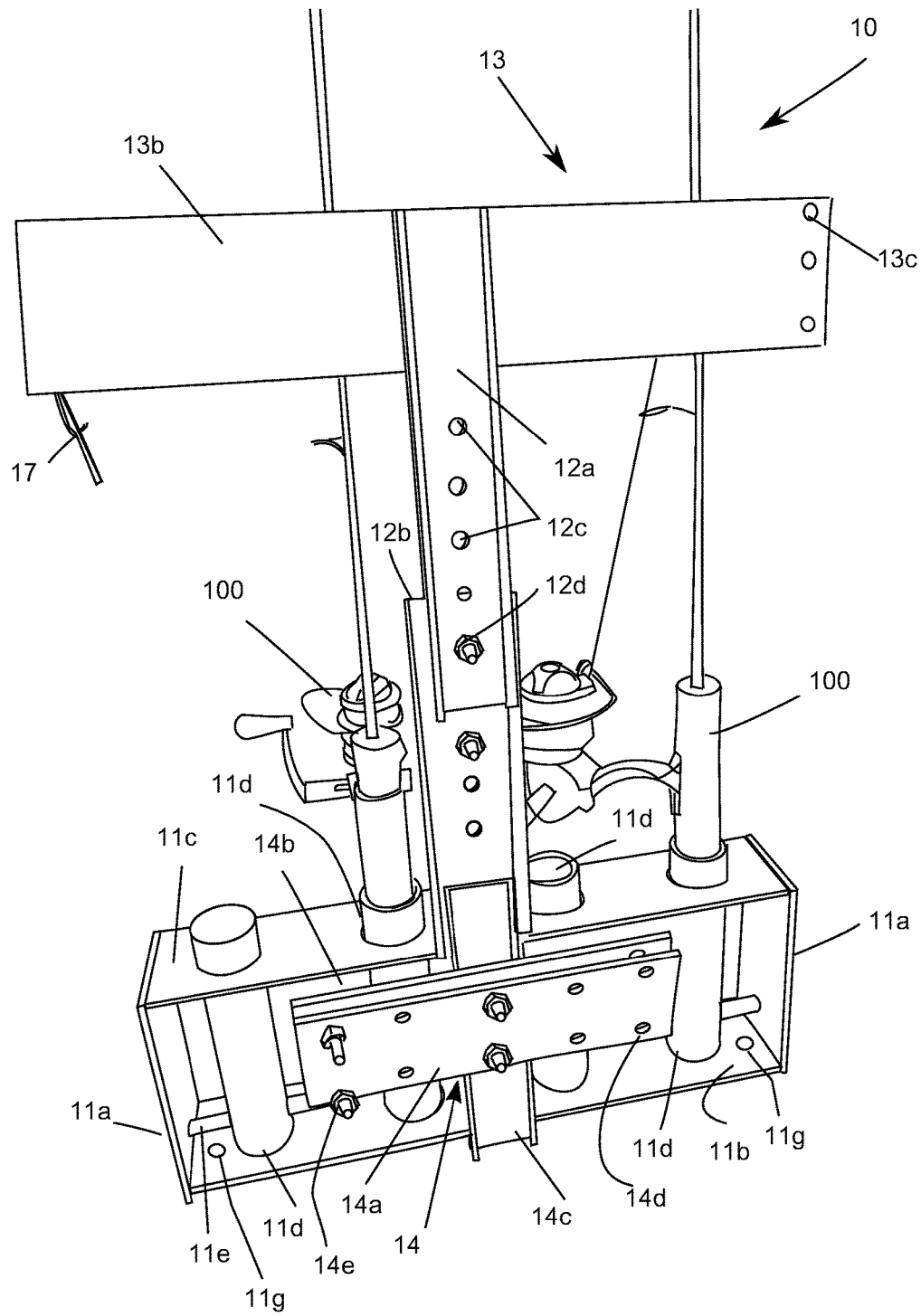
FIG. 2 is a rear perspective view of the invention.
Figure 4:
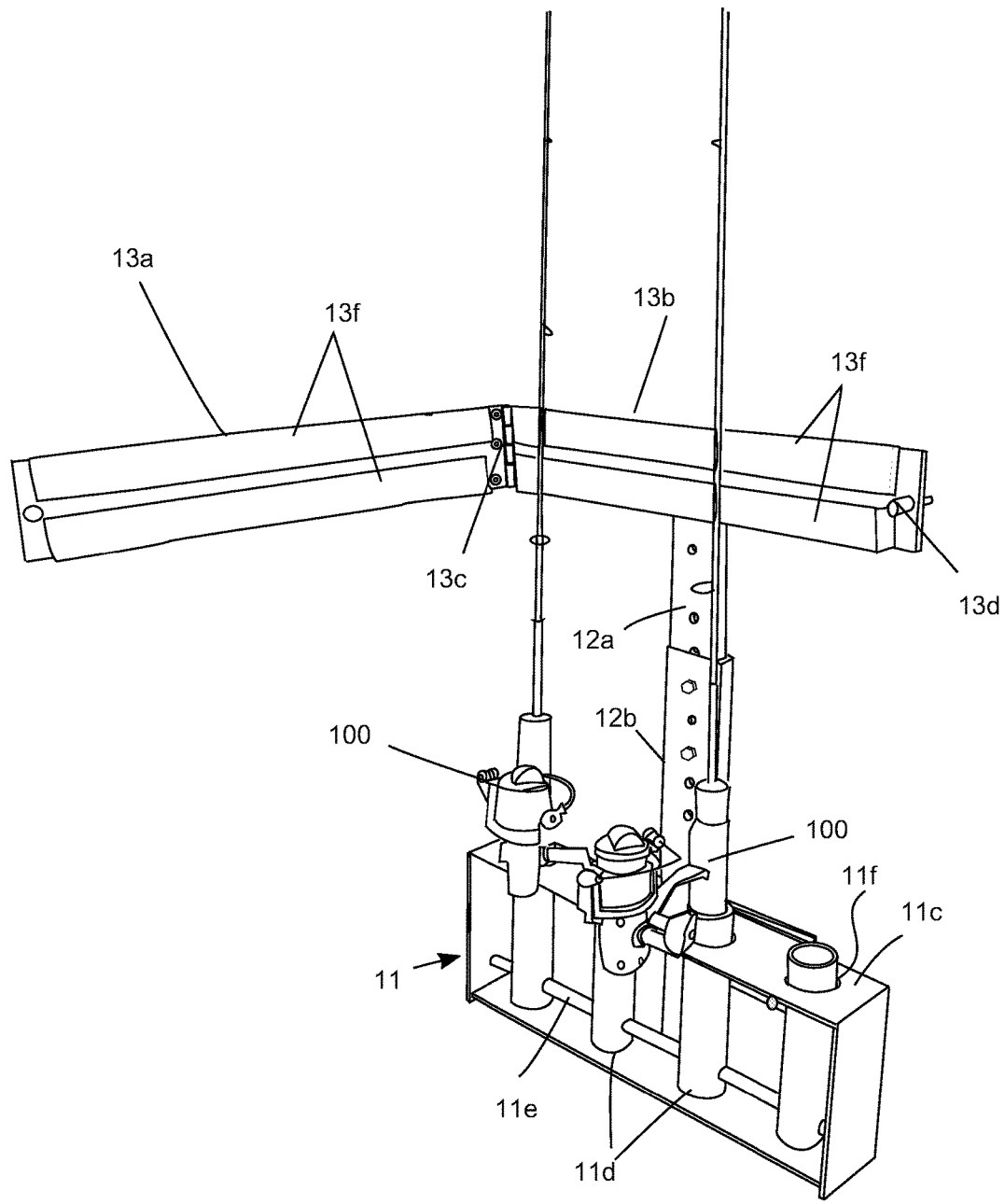
FIG. 4 is a front perspective view of the invention showing the gate opened.

Referring now to the drawings and especially to FIGS. 1, 2 and 4, the invention 10 is a carrier for ice fishings poles that is designed for use with all terrain vehicles and the like. The invention 10 has a lower box holder 11, a central, telescoping post assembly 12, a gate 13 and a mounting bracket 14 (see, FIG. 2).

The lower box holder 11 has a frame that has two side walls 11a, a floor 11b, and a top 11c. As shown in the drawings, both the front and back of the frame are open. Within the box holder 11 are a number of tubes 11d. In the preferred embodiment, the number of tubes is 4. These tubes are made of lightweight plastic, while the box frame can be made of metal such as steel of aluminum. The tubes 11d are secured at their bases by a metal tube 11e that passes through each tube and is then welded to the side walls 11a. The tops of the tubes are secured by the top 11c, which has a number of spaced-apart holes 11f drilled in it to receive the tubes 11d. See FIG. 4 for details of the holes 11f. The tubes 11d are designed to receive the ends (handles) of fishing poles 100 as shown. Finally, holes 11g in the floor 11b are used to bolt the device to a bracket or frame on a vehicle that does not have a fixture to which the bracket 14 (see below) can be attached.

The central telescoping post assembly 12 (see especially FIG. 2) has a lower post 12b that is welded of otherwise secured to the top 11c of the lower box holder 11. The central telescoping post assembly 12 also has an upper post 12a. Each of the posts has a number of holes 12c that allow the height of the central post assembly 12 to be adjusted as desired. Fasteners 12d are used to connect the upper and lower posts. In the preferred embodiment, the fasteners are nuts and bolts.

Figure 3:
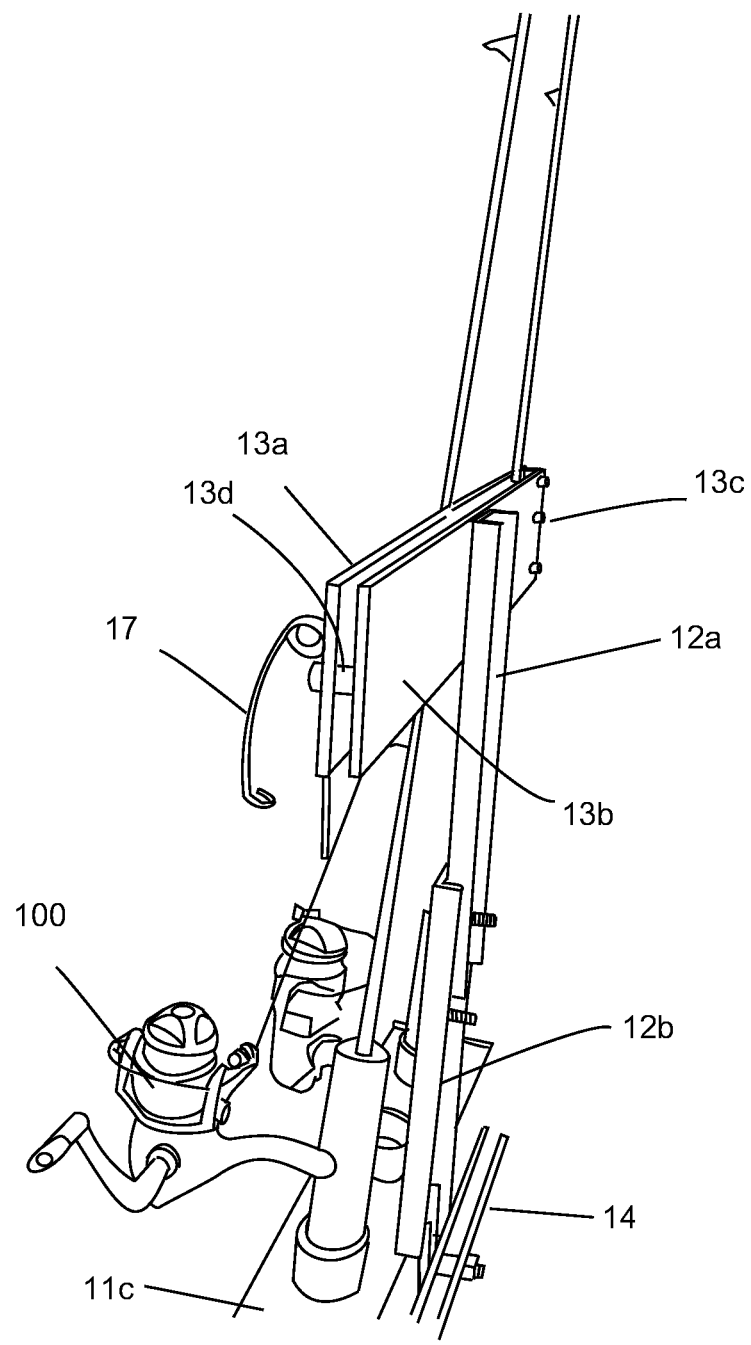
FIG. 3 is a right side detail view of the invention.
Figure 5:
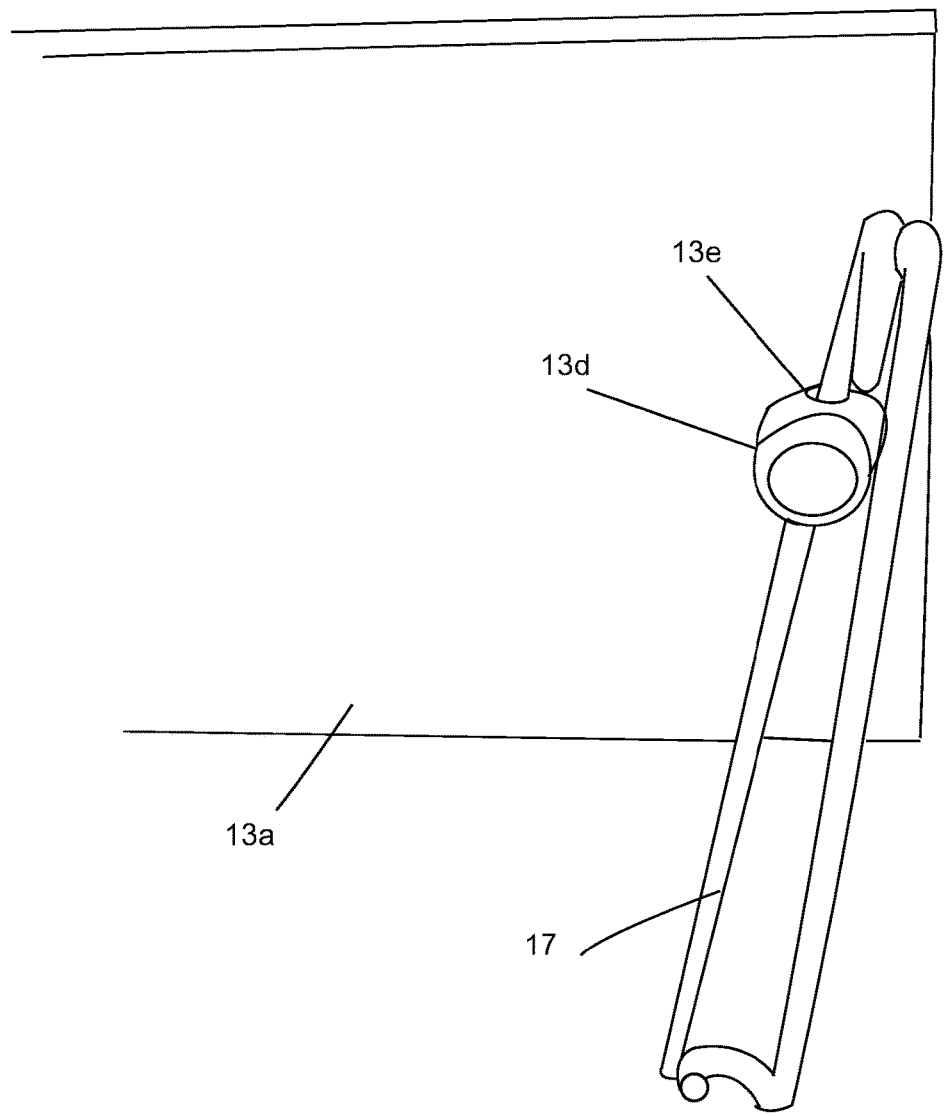
FIG. 5 is a detail view of a fastener in place used to secure the gate.

The gate 13 has a front panel 13a and a back panel 13b, A hinge 13c is attached to the front and back panels as shown. The gate, as shown in FIG. 2 is welded to the top of the upper post 12a as shown. Referring now to FIG. 3, the gate has a spacer 13d between the front and back panels. This spacer passes through the front panel as shown and has a hole 13e to receive a locking pin 17. FIG. 5 is a detail of the spacer 13d and the front panel 13a. Note that the locking pin 17 is one type of pin that can be used. However, any type of locking mechanism can be used to secure the gate in a closed position. Referring now to FIG. 4, the gate 13 is shown in the open position. The gate panels are lined with foam padding 13f as shown to provide protection for the fishing rods 100. Note that this figure shows two rods 100 in place in the carrier 10. Note there are two tubes 11d empty that can receive fishing poles as well. Note too the placement of the fishing poles 100, with the ends of the poles 100 placed in the tubes 11d and the rod portions hold in the gate, the poles are firmly held and protected. As shown in FIG. 3 that the spacer 13d is used to hold the front panel 13a and a back panel 13b apart to better protect the invention. Finally, FIG. 5 shows the hinge 13c in more detail.

Referring now to FIG. 2, the mounting bracket 14 is shown. The bracket has two plates 14a and 14b. Plate 14b is welded to a plate 14c that is secured (welded or otherwise fastened) to the lower post 12b as shown. The bracket 14 has holes 14d as shown to receive fasteners 14e that are used to attach the bracket to the ATV or other vehicle.

Once installed on an ATV, snowmobile or other vehicle, the user can open the gate to install or remove fishing poles as desired. In this way, the poles are carried to and from the fishing site with no damage. And are ready for use without tangles or other complications.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An ice fishing pole carrier comprising:
 a) a lower box frame having a pair of opposed sides, a bottom plate attached to said pair of opposed sides, said bottom plate having a center, and at least one holding tube installed therein;
 b) a pipe installed in said lower box frame and passing through said at least one holding tube, said pipe being fixedly attached to each of said pair of opposed sides;
 c) a single telescoping post, secured to the center of said bottom plate of said lower box frame and extending upwardly therefrom;
 d) a gate, attached to said single telescoping post and being positioned orthogonally thereto, said gate having a rear panel and a front panel, the front panel and rear panel each having two ends and an inner surface;
 e) a hinge operably attached to one end of said front and rear panels;
 f) a fastener for temporarily locking said gate closed; and
 g) a mounting bracket for securing said ice fishing pole carrier to a vehicle.

2. The ice fishing pole carrier of claim 1 wherein said lower box frame has a plurality of holding tubes installed therein.

3. The ice fishing pole carrier of claim 2 wherein said lower box frame has a top plate and further wherein said top plate has a plurality of holes formed therein, centered on a longitudinal axis of said top plate, to allow said plurality of holding tubes to pass therethrough, such that said plurality of holding tubes are surrounded by said top plate.

4. The ice fishing pole carrier of claim 2 wherein said pipe pases through each of said plurality of holding tubes.

5. The ice fishing pole carrier of claim 1 wherein said lower box frame has a top plate, attached to said pair of opposed sides, and further wherein said top plate has at least one hole formed therein, centered on a longitudinal axis of said top plate, to allow said at least one holding tube to pass therethrough, such that said at least one holding tube is surrounded by said top plate.

6. The ice fishing pole carrier of claim 5 wherein the single telescoping post is secured to said top plate.

7. The ice fishing pole carrier of claim 1 wherein said telescoping post has an lower portion and an upper portion.

8. The ice fishing pole carrier of claim 7 wherein the gate is attached to said upper portion of said telescoping post.

9. The ice fishing pole carrier of claim 7 wherein the mounting bracket is secured to said lower portion of said telescoping post.

10. The ice fishing pole carrier of claim 1 wherein the inner surfaces of said front and rear panels of said gate are covered with foam padding.

\* \* \* \* \*